(12) United States Patent
Ye et al.

(10) Patent No.: US 10,721,329 B2
(45) Date of Patent: Jul. 21, 2020

(54) SCHEDULING METHOD AND CUSTOMER PREMISES EQUIPMENT

(71) Applicant: HUAWEI TECHNOLOGIES CO., LTD., Shenzhen, Guangdong (CN)

(72) Inventors: Yanfei Ye, Nanjing (CN); Heping Peng, Nanjing (CN); Ting Xu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 15/847,696

(22) Filed: Dec. 19, 2017

(65) Prior Publication Data
US 2018/0176334 A1    Jun. 21, 2018

(30) Foreign Application Priority Data
Dec. 21, 2016   (CN) .......................... 2016 1 1192464

(51) Int. Cl.
```
H04L 29/08      (2006.01)
H04L 12/24      (2006.01)
H04L 12/863     (2013.01)
H04L 12/801     (2013.01)
H04L 12/815     (2013.01)
H04L 12/70      (2013.01)
```
(52) U.S. Cl.
CPC ............ *H04L 67/327* (2013.01); *H04L 41/14* (2013.01); *H04L 47/00* (2013.01); *H04L 47/10* (2013.01); *H04L 47/22* (2013.01); *H04L 47/6215* (2013.01)

(58) Field of Classification Search
CPC ....... H04L 67/327; H04L 47/00; H04L 47/22; H04L 47/10; H04L 47/6215; H04L 41/14; H04L 1/1854; H04L 1/1887; H04L 12/1881; H04L 12/4015; H04L 2012/5679; H04L 2012/6489; H04L 29/08945; H04L 47/50; H04L 47/56; H04L 47/58; H04L 47/60; H04L 49/254
See application file for complete search history.

(56) References Cited

U.S. PATENT DOCUMENTS 6,205,150 B1    3/2001  Ruszczyk
7,231,425 B1    6/2007  Charny et al.
(Continued)

OTHER PUBLICATIONS https://en.wikipedia.org/wiki/Token_bucket, Jun. 5, 2019.*
(Continued)

*Primary Examiner* — Michael Won
(74) *Attorney, Agent, or Firm* — Fish & Richardson P.C.

(57) ABSTRACT

A data scheduling method and customer premises equipment are provided. The customer premises equipment stores, in a first queue, received service data that is sent from a first network to a second network. Test data is generated that is to be sent from the first network to the second network. The test data is stored in a second queue. The customer premises equipment preferentially schedules the service data in the first queue to be in a third queue and in response to determining that a rate at which the service data is received is lower than a preset limit rate, schedules the test data in the second queue to be in the third queue to reach the limit rate. The service data and/or the test data in the third queue is sent to the second network at the limit rate.

18 Claims, 5 Drawing Sheets

(56) References Cited

U.S. PATENT DOCUMENTS

| | | | |
|---|---|---|---|
| 7,350,208 B1* | 3/2008 | Shoham | G06F 9/4881 718/102 |
| 9,432,445 B1* | 8/2016 | Leonard | H04L 67/1008 |
| 2002/0071387 A1* | 6/2002 | Horiguchi | H04L 47/10 370/229 |
| 2004/0090974 A1* | 5/2004 | Balakrishnan | H04L 47/10 370/412 |
| 2005/0117778 A1* | 6/2005 | Crabtree | G06K 9/00771 382/103 |
| 2006/0039374 A1* | 2/2006 | Belz | H04L 47/10 370/389 |
| 2007/0086470 A1* | 4/2007 | Sekido | H04L 47/60 370/412 |
| 2007/0116025 A1* | 5/2007 | Yadlon | H04L 47/60 370/412 |
| 2007/0165647 A1* | 7/2007 | Kenney | H04L 47/525 370/395.4 |
| 2009/0168793 A1* | 7/2009 | Fox | H04L 47/521 370/412 |
| 2012/0243412 A1* | 9/2012 | Voruganti | H04L 47/30 370/235 |
| 2012/0327779 A1* | 12/2012 | Gell | H04L 47/2475 370/238 |
| 2013/0297912 A1* | 11/2013 | Tran | G06F 9/3814 712/208 |
| 2015/0016266 A1* | 1/2015 | Dumitrescu | H04L 47/623 370/236 |
| 2015/0055456 A1* | 2/2015 | Agarwal | H04L 49/9047 370/230 |
| 2016/0044695 A1* | 2/2016 | Gunner | H04L 49/90 370/336 |
| 2016/0295265 A1* | 10/2016 | Li | H04N 21/26216 |
| 2016/0308773 A1* | 10/2016 | Easty | H04L 41/24 |
| 2016/0328573 A1* | 11/2016 | Luff | G06F 9/54 |
| 2017/0295587 A1* | 10/2017 | Lam | H04L 43/16 |
| 2018/0084020 A1* | 3/2018 | Li | H04L 43/16 |
| 2018/0176334 A1* | 6/2018 | Ye | H04L 47/00 |

OTHER PUBLICATIONS

RFC2544 S. Bradner et al.,"Benchmarking Methodology for Network Interconnect Devices",Network Working Group, dated Mar. 1999,total 31 pages.

Recommendation ITU-T Y.1564 Series Y: Global Information Infrastructure, Internet Protocol Aspects,and Next—Generation Networks, Internet of Things and Smart Cities,Internet protocol aspects—Quality of service and network performance,Ethernet service activation test methodology,dated Feb. 2016, total 38 pages.

Extended European Search Report issued in European Application No. 17209290.0 dated Apr. 19, 2018, 7 pages.

* cited by examiner

SCHEDULING METHOD AND CUSTOMER PREMISES EQUIPMENT

CROSS-REFERENCE TO RELATED APPLICATION

This application claims priority to Chinese Patent Application No. 201611192464.2, filed on Dec. 21, 2016, which is hereby incorporated by reference in its entirety.

TECHNICAL FIELD

This application relates to the communications field, and in particular, to a data scheduling method and customer premises equipment.

BACKGROUND

FIG. 1 is an example of a communications private line deployed by an operator for an enterprise. A customer A and a customer B are two branch networks of an enterprise. The customer A is connected through customer premises equipment (CPE) A to a metropolitan area access network A provided by the operator. The customer B is connected through CPE B to a metropolitan area access network B provided by the operator. The metropolitan area access network A and the metropolitan area access network B are connected through provider edge (PE) devices to a core network, and communicate with each other by using the core network.

A metropolitan area access network provides operator-committed bandwidth. For example, as shown in FIG. 1, the operator-committed bandwidth is 20 Mbps. The operator may send test data to the metropolitan area access network to test whether bandwidth of the metropolitan area access network reaches the committed bandwidth. However, such a manner can be applied only before the metropolitan area access network transmits service data of the enterprise. If the metropolitan area access network has begun transmitting the service data of the enterprise, the test data occupies bandwidth of the service data, and consequently, normal operation of an enterprise service is affected.

SUMMARY

This application provides a data scheduling method and customer premises equipment, to mitigate a problem that test data occupies bandwidth of service data in a bandwidth testing process.

A first aspect of this application provides a data scheduling method, including: storing, in a first queue, received service data that is sent from a first network to a second network; generating test data that is to be sent from the first network to the second network, and storing the test data in a second queue; preferentially scheduling the service data in the first queue to be in a third queue, and when a rate of the service data is lower than a preset limit rate, scheduling the test data in the second queue to be in the third queue to reach the limit rate; and sending the service data and/or the test data in the third queue at the limit rate. Because the service data is preferentially scheduled, and the test data is scheduled only when the rate of the service data is lower than the preset limit rate, the test data does not occupy bandwidth of the service data. In addition, if the rate of the service data cannot reach the limit rate, the test data is scheduled to reach the limit rate. Therefore, a rate of sent data can reach the limit rate, and whether actual bandwidth reaches committed bandwidth can be tested.

A second aspect of this application provides customer premises equipment, including: a memory and a processor. The memory includes first storage space, second storage space, and third storage space. The first storage space is used to store a first queue, the second storage space is used to store a second queue, and the third storage space is used to store a third queue. The processor is configured to store, in the first queue, received service data that is sent from a first network to a second network; generate test data that is to be sent from the first network to the second network, and store the test data in the second queue; preferentially schedule the service data in the first queue to be in the third queue, and when a rate of the service data is lower than a preset limit rate, schedule the test data in the second queue to be in the third queue to reach the limit rate; and send the service data and/or the test data in the third queue at the limit rate.

A third aspect of this application provides customer premises equipment, including: a data generation module, a storage module, and a scheduling module. The data generation module is configured to generate test data that is to be sent from a first network to a second network. The storage module is configured to: store, in a first queue, received service data that is sent from the first network to the second network, and store the test data in a second queue. The scheduling module is configured to: preferentially schedule the service data in the first queue to be in a third queue, and when a rate of the service data is lower than a preset limit rate, schedule the test data in the second queue to be in the third queue to reach the limit rate; and send the service data and/or the test data in the third queue at the limit rate.

In an implementation, the preferentially scheduling the service data in the first queue to be in a third queue, and when a rate of the service data is lower than a preset limit rate, scheduling the test data in the second queue to be in the third queue to reach the limit rate includes: scheduling the service data in the first queue to be in the third queue according to a guaranteed rate of the first queue, where the guaranteed rate of the first queue is the limit rate; and scheduling the test data in the second queue to be in the third queue according to a guaranteed rate of the second queue, where the guaranteed rate of the second queue is zero, and a guaranteed rate of a queue is a minimum rate at which data is scheduled to be out of the queue when the queue is not empty.

In an implementation, the preferentially scheduling the service data in the first queue to be in a third queue, and when a rate of the service data is lower than a preset limit rate, scheduling the test data in the second queue to be in the third queue to reach the limit rate includes: scheduling the service data in the first queue and the test data in the second queue to be in the third queue in a priority queuing manner according to the limit rate, where a priority of the second queue is lower than a priority of the first queue.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

Figure 1:
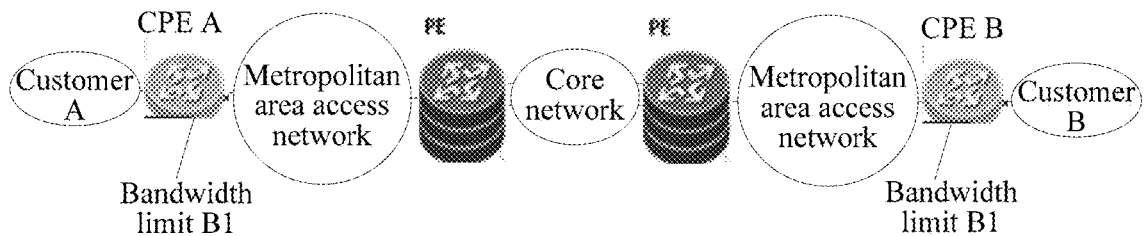
FIG. 1 is a schematic diagram of a communications private line deployed by an operator for an enterprise.
Figure 2:
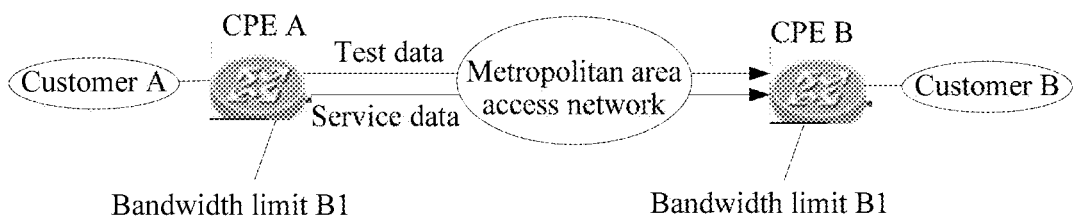
FIG. 2 is a simplified schematic diagram of a communications private line deployed by an operator for an enterprise.

In all embodiments of this application, it is assumed that a core network has normal bandwidth and a PE device is normal. Therefore, FIG. 1 may be simplified into FIG. 2. In FIG. 2, a customer A is connected through CPE A to a metropolitan area access network provided by an operator, a customer B is connected through CPE B to the metropolitan area access network provided by the operator, and the CPE A communicates with the CPE B. The operator sets limit bandwidth between the customer A and the CPE A and limit bandwidth between the customer B and the CPE B to B1, so that committed bandwidth of a link between the customer A and the customer B is B1.

The CPE A may be a router or a switch. The CPE B may be a router or a switch.

A bandwidth testing method described in each embodiment of this application is applied to a process in which an enterprise runs a service by using a private network, to test whether actual bandwidth of a metropolitan area access network reaches committed bandwidth on the premise that bandwidth of service data is not occupied.

The following describes technical solutions in the embodiments of this application with reference to the accompanying drawings in the embodiments of this application.

Figure 3:
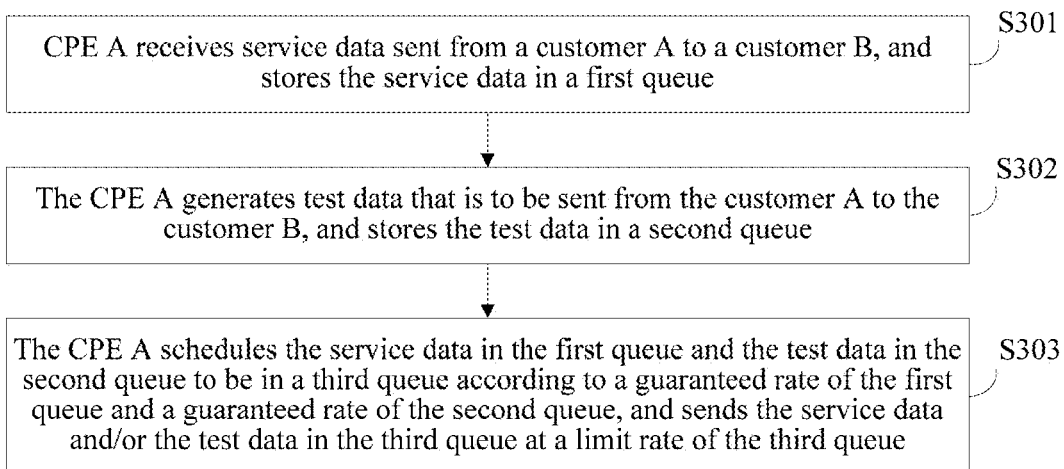
FIG. 3 is a flowchart of a scheduling method disclosed according to an embodiment of this application.

FIG. 3 shows a data scheduling method disclosed according to an embodiment of this application. The method is applied to the scenario shown in FIG. 2, and includes the following steps.

S301. CPE A receives service data sent from a customer A to a customer B, and stores the service data in a first queue.

Figure 4:
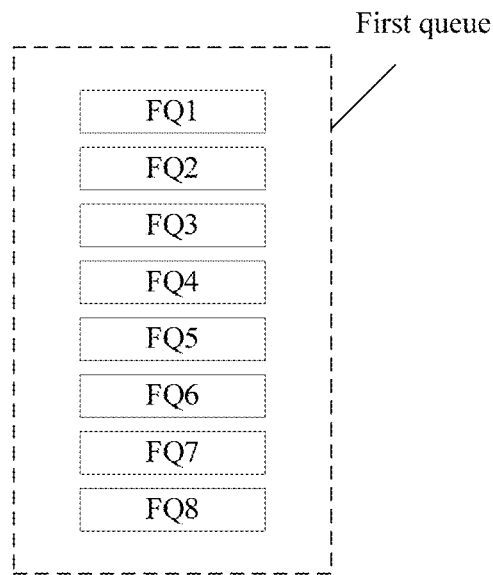
FIG. 4 is a schematic diagram of a queue used for storing service data disclosed according to an embodiment of the present invention.

Optionally, as shown in FIG. 4, the first queue includes multiple (for example, 8) subqueues. Priorities of the multiple subqueues are different. Service data with a high priority is stored in a subqueue with a high priority.

S302. The CPE A generates test data that is to be sent from the customer A to the customer B, and stores the test data in a second queue.

A guaranteed rate of the first queue is different from that of the second queue. If a queue is not empty, a rate at which data is scheduled to be out of the queue is at least a guaranteed rate of the queue.

For example, if a rate at which data enters the first queue is lower than the guaranteed rate of the first queue, a rate at which data can be scheduled to be out of the first queue is higher than the rate at which data enters the first queue. Therefore, no data is backlogged in the first queue (the queue is empty in this case), and the rate at which data is scheduled to be out of the first queue is the rate at which data enters the first queue. If a rate at which data enters the first queue is higher than the guaranteed rate of the first queue, a rate at which data can be scheduled to be out of the first queue is equal to the guaranteed rate of the first queue. Because the rate at which data enters the first queue is higher than the rate at which data can be scheduled to be out of the first queue, data that has not been scheduled is backlogged in the first queue. If a rate at which data subsequently enters the first queue decreases to a rate lower than the guaranteed rate of the first queue, data backlogged in the first queue is scheduled to be out of the first queue in time. If an excessively large amount of data is backlogged in the first queue, the CPE A may discard the service data.

In this embodiment, to ensure that bandwidth of the service data is not occupied by the test data, the guaranteed rate of the first queue is maximum bandwidth B1 between the CPE A and CPE B, and the guaranteed rate of the second queue is 0.

The CPE A may generate test data at a rate equal to B1 or higher than B1. Alternatively, the CPE A may generate test data at a rate at which the test data is scheduled to be out of the second queue. In conclusion, it needs to be ensured that the second queue is always not empty.

Optionally, during scheduling of data in the first queue, data in a subqueue with a relatively high priority may be scheduled first, and then data in a subqueue with a relatively low priority is scheduled.

S303. The CPE A schedules the service data in the first queue and the test data in the second queue to be in a third queue according to a guaranteed rate of the first queue and a guaranteed rate of the second queue, and sends the service data and/or the test data in the third queue at a limit rate of the third queue.

A limit rate is used to indicate a maximum transmission rate of data in a queue. The limit rate of the third queue is set to B1. Optionally, limit rates are configured for the first queue and the second queue, and the limit rate of the first queue and the limit rate of the second queue are higher than or equal to B1. Optionally, a guaranteed rate is configured for the third queue, and the guaranteed rate of the third queue is B1.

Because the guaranteed rate of the first queue is equal to the limit rate of the third queue, the CPE A sends the service data in the first queue at a rate not higher than the guaranteed rate of the first queue. In addition, all service data can be sent, provided that a rate at which the CPE A receives the service data is not higher than the guaranteed rate.

Because the guaranteed rate of the second queue is 0, if the rate at which the CPE A receives the service data is higher than or equal to the limit rate of the third queue, the CPE A does not send any test data. If the rate at which CPE A receives the service data is lower than the limit rate of the third queue, the CPE A sends the test data at a rate equal to a difference between the limit rate and an actual rate at which the service data is being received.

For example, the limit rate of the third queue is 1 Gbps, the guaranteed rate of the first queue is 1 Gbps, the guaranteed rate of the second queue is 0, and the actual rate at which the CPE A receives the service data is 800 Mbps. The CPE A transmits the received service data at a rate of 800 Mbps, and transmits, at a rate of 200 Mbps, the test data generated by the CPE A.

The CPE B measures traffic of received data (which may include test data and service data, or may include only service data). If the traffic of the received data is greater than or equal to B1, it indicates that no packet loss occurs on a transmission path between the CPE A and the CPE B, and committed bandwidth is achieved. If the traffic of the received data is less than B1, it indicates that a packet loss occurs on a transmission path between the CPE A and the CPE B, and the bandwidth cannot reach a committed value.

It may be learned, from a process shown in FIG. 3, that the limit rate is preset for the third queue, and the guaranteed rates are allocated to the first queue and the second queue. In a process of scheduling queues, data in the first queue and data in the second queue are first scheduled to be in the third queue according to the guaranteed rate of the first queue and the guaranteed rate of the second queue, and then data in the third queue is scheduled to be out of the third queue according to the limit rate of the third queue. In this way, when service data exists, the service data is preferentially sent, and when the traffic of the service data is less than the committed bandwidth, the test data is used to make up the traffic. Therefore, on the premise of ensuring that bandwidth can be tested at a peer end, the test data is prevented from occupying the bandwidth of the service data.

Figure 5:
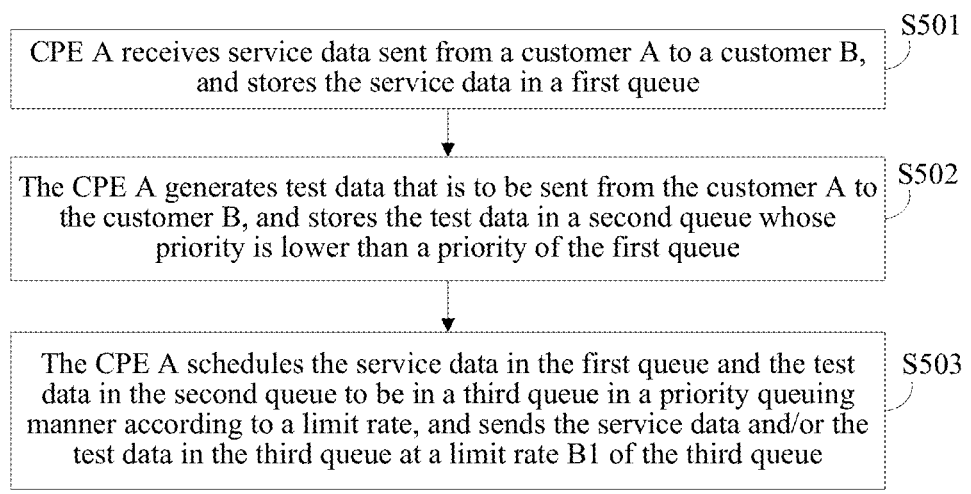
FIG. 5 is a flowchart of another scheduling method disclosed according to an embodiment of this application.

FIG. 5 shows another data scheduling method disclosed according to an embodiment of this application. Different from the method in which a limit rate and a guaranteed rate are used to schedule queues in FIG. 3 so as to preferentially send service data, a manner of setting priorities for queues is used in FIG. 5 so as to preferentially schedule service data.

FIG. 5 includes the following steps:

S501. CPE A stores, in a first queue, service data sent from a customer A to a customer B.

S502. The CPE A generates test data that is to be sent from the customer A to the customer B, and stores the test data in a second queue. A priority of the second queue is lower than a priority of the first queue.

S503. The CPE A schedules the service data in the first queue and the test data in the second queue to be in a third queue in a priority queuing manner according to a limit rate B1, and sends the service data and/or the test data in the third queue at the limit rate B1 of the third queue.

The priority queuing manner includes: before sending data each time, scanning queues in descending order of priorities, and sending data in a queue, with a highest priority, in non-empty queues.

If an actual rate of scheduling the service data is higher than or equal to B1 and the first queue is not empty, because the priority of the first queue is higher than the priority of the second queue, the CPE A preferentially schedules all service data in the first queue to be in the third queue, but does not schedule the test data in the second queue. If an actual rate of scheduling the service data is lower than B1, the CPE A schedules the test data in the second queue to be in the third queue at a rate of (B1—the actual rate).

It may be learned, from FIG. 5, that priorities are preset for the queues to ensure that all service data in a queue with a high priority is sent. When traffic of the service data is less than committed bandwidth, the test data is used to make up the traffic, thereby preventing the test data from occupying the bandwidth of the service data in a bandwidth testing process.

Figure 6:
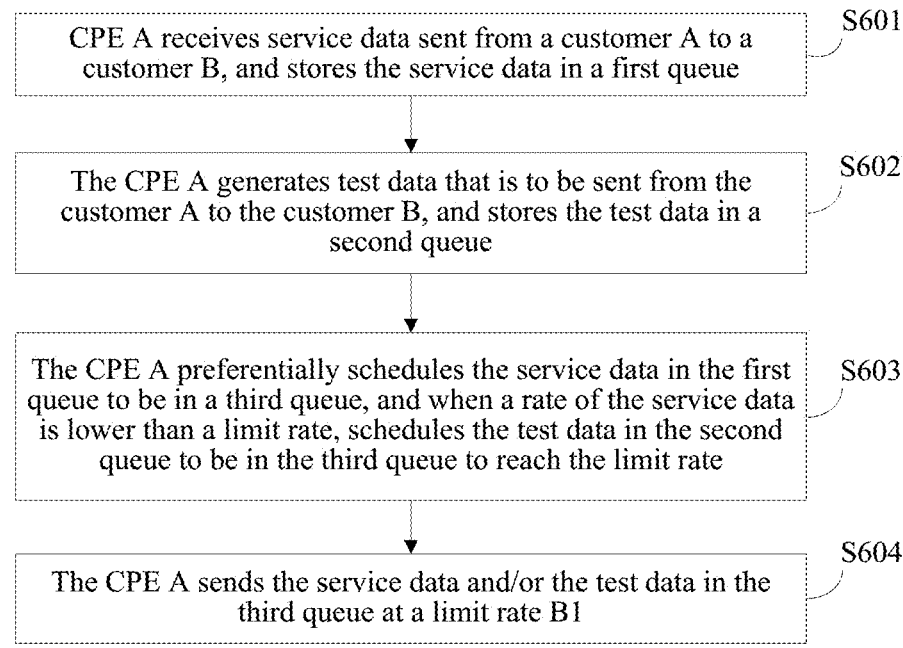
FIG. 6 is a flowchart of still another scheduling method disclosed according to an embodiment of this application.

FIG. 6 shows still another data scheduling method disclosed according to an embodiment of this application, and the method includes the following steps.

S601. CPE A receives service data sent from a customer A to a customer B, and stores the service data in a first queue.

S602. The CPE A generates test data that is to be sent from the customer A to the customer B, and stores the test data in a second queue.

S603. The CPE A preferentially schedules the service data in the first queue to be in a third queue, and when a rate of the service data is lower than a limit rate, schedules the test data in the second queue to be in the third queue to reach the limit rate.

S603 may be implemented by setting guaranteed rates for the first queue and the second queue and setting a limit rate for the third queue, for example, by using the method shown in FIG. 3.

Alternatively, S603 may be implemented by setting priorities for the first queue and the second queue and setting a limit rate for the third queue, for example, by using the method shown in FIG. 5.

S604. The CPE A sends the service data and/or the test data in the third queue at the limit rate.

Figure 7:
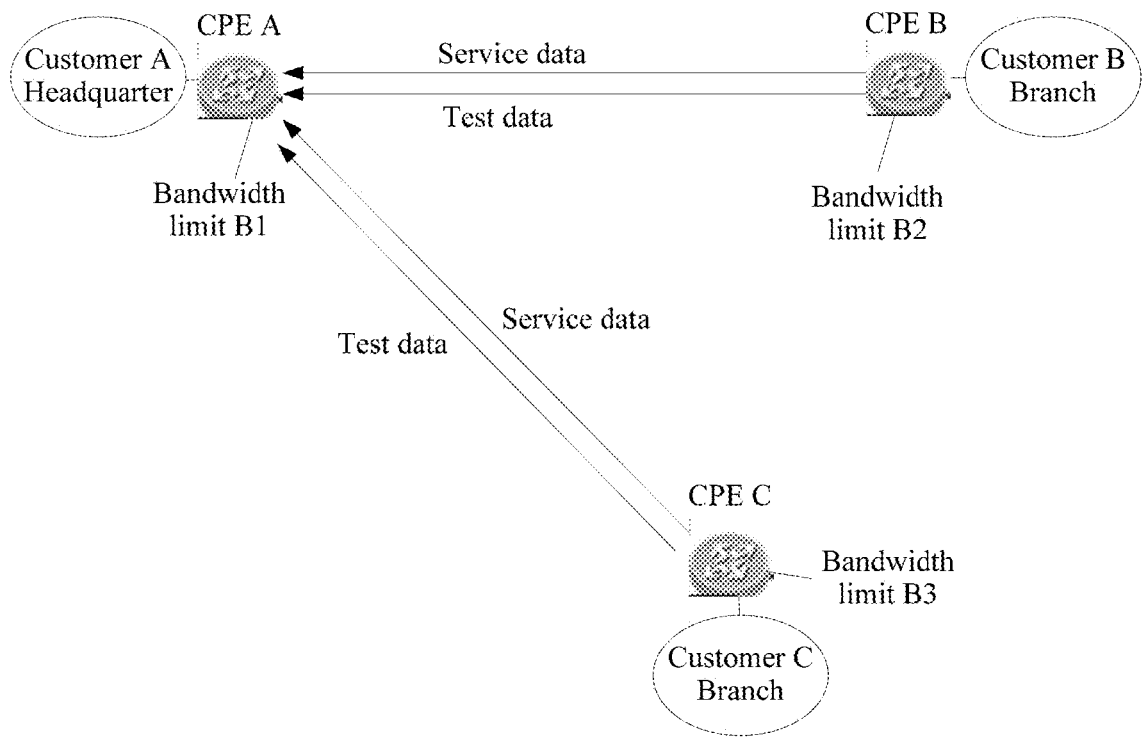
FIG. 7 is a simplified schematic diagram of another communications private line deployed by an operator for an enterprise.
Figure 8:
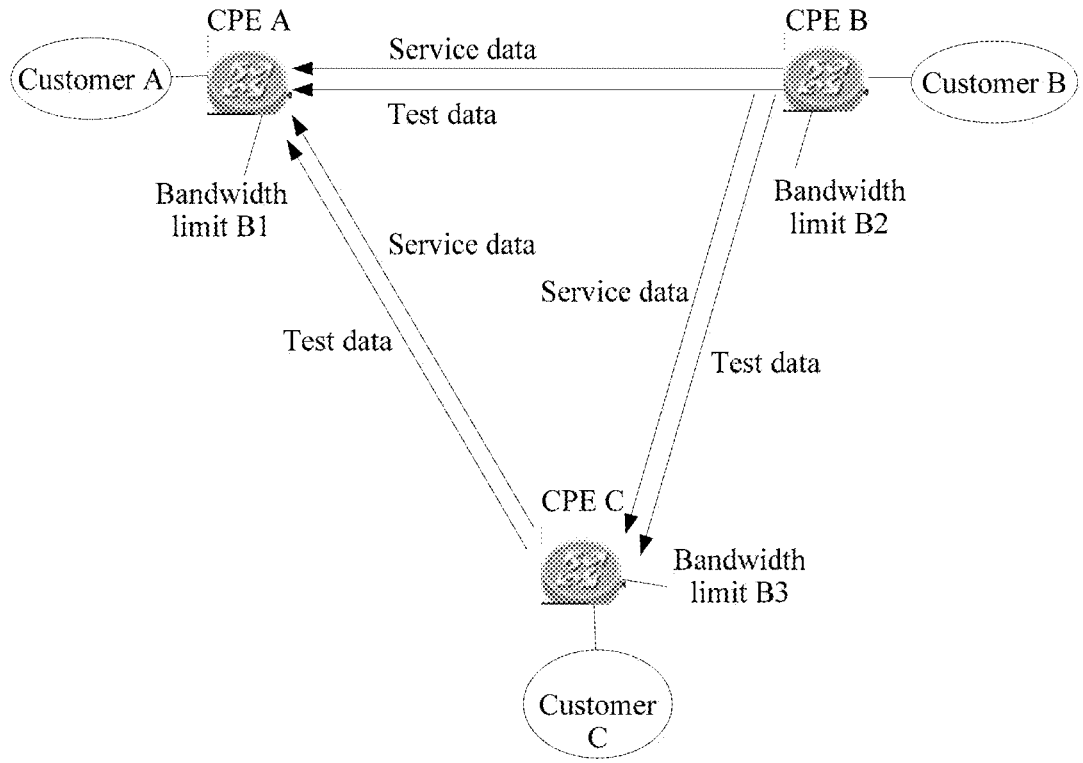
FIG. 8 is a simplified schematic diagram of still another communications private line deployed by an operator for an enterprise.

Steps shown in FIG. 3, FIG. 5 or FIG. 6 may further be applied to scenarios shown in FIG. 7 and FIG. 8 in addition to the scenario shown in FIG. 2.

In FIG. 7, a customer A is a headquarter network, and a customer B and a customer C are both branch networks. The customer B and the customer C can both access the customer A, but the customer B and the customer C cannot access each other. A bandwidth limit between the customer A and the CPE A is B1, and a bandwidth limit between the customer B and CPE B is B2. A bandwidth limit between the customer C and CPE C is B3. A bandwidth planning rule is: B1>B2, B1>B3, and B1≤B2+B3.

A method for measuring bandwidth of a metropolitan area access network between the CPE B and the CPE A is as follows: As a test initiating party, the CPE B implements functions of the CPE A shown in FIG. 3, FIG. 5, or FIG. 6; as a test receiving party, the CPE A implements functions of the CPE B shown in FIG. 3, FIG. 5, or FIG. 6. The CPE A can differentiate data sent from the CPE B from data sent from the CPE C in a manner of, for example, identifying a MAC address. Therefore, by collecting statistics on a size of the data sent from the CPE B, the CPE A can determine whether bandwidth between the CPE B and the CPE A reaches committed bandwidth of an operator.

A method for measuring bandwidth of a metropolitan area access network between the CPE C and the CPE A is as follows: As a test initiating party, the CPE C implements functions of the CPE A shown in FIG. 3, FIG. 5, or FIG. 6; as a test receiving party, the CPE A implements functions of the CPE B shown in FIG. 3, FIG. 5, or FIG. 6. By collecting statistics on a size of data sent from the CPE C, the CPE A can determine whether bandwidth between the CPE C and the CPE A reaches committed bandwidth of the operator.

In FIG. 8, a customer A, a customer B, and a customer C are three networks that can access each other. A bandwidth limit between the customer A and CPE A is B1, and a bandwidth limit between the customer B and CPE B is B2. A bandwidth limit between the customer C and CPE C is B3.

As shown in FIG. 8, every two of the CPE A, the CPE B, and the CPE C may be combined. CPE whose bandwidth limit value is lower serves as a test initiating party, and CPE whose bandwidth limit value is higher serves as a test receiving party, to check whether bandwidth between the two CPEs reaches committed bandwidth. For example, B1>B2, as a test initiating party, the CPE B completes data scheduling in a manner shown in FIG. 3, FIG. 5, or FIG. 6, and then sends data (including service data and/or test data) whose traffic is B2 to the CPE A. If the traffic of the data received by the CPE A from the CPE B reaches B2, it indicates that a metropolitan area network between the CPE A and the CPE B reaches the committed bandwidth.

Figure 9:
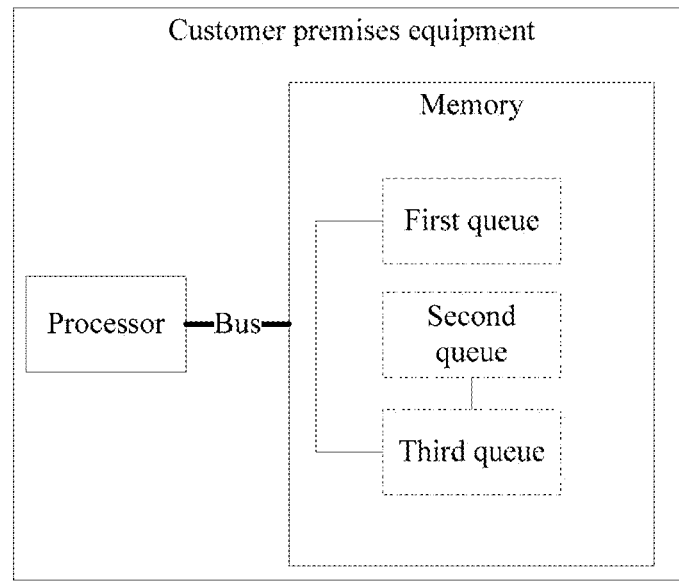
FIG. 9 is a schematic structural diagram of customer premises equipment disclosed according to an embodiment of this application.

FIG. 9 shows a structure of the CPE A shown in FIG. 3, FIG. 5, or FIG. 6, including a memory and a processor. The memory may be disposed inside the processor. The processor and the memory may communicate with each other by using a bus.

The memory includes first storage space, second storage space, and third storage space. The first storage space is used to store a first queue, the second storage space is used to store a second queue, and the third storage space is used to store a third queue.

The processor is configured to: store, in the first queue, received service data that is sent from a first network to a second network; generate test data that is to be sent from the first network to the second network, and store the test data in the second queue; and preferentially schedule the service data in the first queue to be in the third queue, and when a rate of the service data is lower than a preset limit rate, schedule the test data in the second queue to be in the third queue to reach the limit rate.

For a specific implementation in which the processor preferentially schedules the service data in the first queue to be in a third queue, and when a rate of the service data is lower than a preset limit rate, schedules the test data in the second queue to be in the third queue to reach the limit rate, refer to the foregoing method embodiments, and details are not described herein again.

The CPE shown in FIG. 9 preferentially schedules the service data, thereby mitigating that the test data occupies transmission resources of the service data in a bandwidth measurement process.

Figure 10:
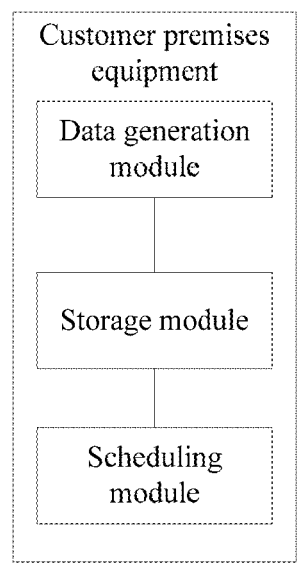
FIG. 10 is a schematic structural diagram of another customer premises equipment disclosed according to an embodiment of this application.

FIG. 10 shows another structure of customer premises equipment, including a data generation module, a storage module, and a scheduling module.

The data generation module is configured to generate test data that is to be sent from a first network to a second network. The storage module is configured to: store, in a first queue, received service data that is sent from the first network to the second network, and store the test data in a second queue. The scheduling module is configured to: preferentially schedule the service data in the first queue to be in a third queue, and when a rate of the service data is lower than a preset limit rate, schedule the test data in the second queue to be in the third queue to reach the limit rate.

For a specific implementation in which the scheduling module preferentially schedules the service data in the first queue to be in the third queue, and when a rate of the service data is lower than a preset limit rate, schedules the test data in the second queue to be in the third queue to reach the limit rate, refer to the foregoing method embodiments, and details are not described herein again.

The CPE shown in FIG. 10 can mitigate that the test data occupies transmission resources of the service data.

What is claimed is:

1. A data scheduling method implemented by a network device, the method comprises:
   storing, in a first queue, received service data sent from a first network to a second network;
   generating test data to be sent from the first network to the second network, wherein the test data tests whether bandwidth of a network reaches a committed bandwidth;
   storing the test data in a second queue;
   scheduling the service data in the first queue and the test data in the second queue to be in a third queue, including:
     preferentially scheduling the service data in the first queue to be in the third queue; and
     in response to determining that a rate at which the service data is received is lower than a preset limit rate, scheduling the test data in the second queue to be in the third queue to reach the preset limit rate; and
   sending at least one of the service data or the test data in the third queue to the second network at the preset limit rate.

2. The method according to claim 1, wherein the preferentially scheduling the service data in the first queue to be in the third queue and, in response to determining that the rate of the service data is lower than the preset limit rate, scheduling the test data in the second queue to be in the third queue to reach the limit rate comprises:
   scheduling the service data in the first queue to be in the third queue according to a guaranteed rate of the first queue, wherein the guaranteed rate of the first queue is the limit rate; and
   scheduling the test data in the second queue to be in the third queue according to a guaranteed rate of the second queue, wherein the guaranteed rate of the second queue is zero, and
   wherein a guaranteed rate of a particular queue is a minimum rate at which data is scheduled to be out of the particular queue when the particular queue is not empty.

3. The method according to claim 2, wherein the test data is generated at a rate equal to the limit rate or higher than the limit rate.

4. The method according to claim 2, wherein the test data is generated at a rate at which test data already stored in the second queue is scheduled to be out of the second queue.

5. The method according to claim 2, wherein the first queue comprises a plurality of subqueues, and wherein the scheduling the service data in the first queue to be in the third queue according to the guaranteed rate of the first queue comprises:
   scheduling data in a subqueue with a relatively higher priority to be in the third queue, then scheduling data in a subqueue with a relatively lower priority to be in the third queue.

6. The method according to claim 1, wherein the preferentially scheduling the service data in the first queue to be in the third queue and, in response to determining that the rate of the service data is lower than the preset limit rate, scheduling the test data in the second queue to be in the third queue to reach the limit rate comprises:
   scheduling the service data in the first queue and the test data in the second queue to be in the third queue in a priority queuing manner according to the limit rate, wherein a priority of the second queue is lower than a priority of the first queue.

7. Customer premises equipment, comprising:
   a memory, wherein the memory comprises first storage space, second storage space, and third storage space, wherein the first storage space is used to store a first queue, wherein the second storage space is used to store a second queue, and wherein the third storage space is used to store a third queue; and at least one processor, configured to:
store, in the first queue, received service data sent from a first network to a second network;
generate test data to be sent from the first network to the second network, wherein the test data tests whether bandwidth of a network reaches a committed bandwidth;
store the test data in the second queue;
schedule the service data in the first queue and the test data in the second queue to be in the third queue, including:
preferentially scheduling the service data in the first queue to be in the third queue; and
in response to determining that a rate at which the service data is received is lower than a preset limit rate, scheduling the test data in the second queue to be in the third queue to reach the preset limit rate; and
send at least one of the service data or the test data in the third queue to the second network at the preset limit rate.

8. The customer premises equipment according to claim 7, wherein the at least one processor is configured to:
schedule the service data in the first queue to be in the third queue according to a guaranteed rate of the first queue, wherein the guaranteed rate of the first queue is the limit rate; and
schedule the test data in the second queue to be in the third queue according to a guaranteed rate of the second queue, wherein the guaranteed rate of the second queue is zero; and
wherein a guaranteed rate of a particular queue is a minimum rate at which data is scheduled to be out of the particular queue when the particular queue is not empty.

9. The customer premises equipment according to claim 8, wherein the at least one processor is configured to generate the test data at a rate equal to the limit rate or higher than the limit rate.

10. The customer premises equipment according to claim 8, wherein the at least one processor is configured to generate the test data at a rate at which test data already stored in the second queue is scheduled to be out of the second queue.

11. The customer premises equipment according to claim 8, wherein the first queue comprises a plurality of subqueues, and wherein the at least one processor is configured to schedule data in a subqueue with a relatively higher priority to be in the third queue, and then schedule data in a subqueue with a relatively lower priority to be in the third queue.

12. The customer premises equipment according to claim 7, wherein the at least one processor is configured to schedule the service data in the first queue and the test data in the second queue to be in the third queue in a priority queuing manner according to the limit rate, wherein a priority of the second queue is lower than a priority of the first queue.

13. A non-transitory computer-readable medium coupled to at least one processor and storing programming instructions for execution by the at least one processor, wherein the programming instructions, when executed, instruct the at least one processor to:

store, in a first queue, received service data sent from a first network to a second network;
generate test data to be sent from the first network to the second network, wherein the test data tests whether bandwidth of a network reaches a committed bandwidth;
storing the test data in a second queue;
scheduling the service data in the first queue and the test data in the second queue to be in a third queue, including:
preferentially scheduling the service data in the first queue to be in the third queue; and
in response to determining that a rate at which the service data is received is lower than a preset limit rate, scheduling the test data in the second queue to be in the third queue to reach the preset limit rate; and
send at least one of the service data or the test data in the third queue to the second network at the preset limit rate.

14. The non-transitory computer-readable medium according to claim 13, wherein the programming instructions, when executed, instruct the at least one processor to:
schedule the service data in the first queue to be in the third queue according to a guaranteed rate of the first queue, wherein the guaranteed rate of the first queue is the limit rate; and
schedule the test data in the second queue to be in the third queue according to a guaranteed rate of the second queue, wherein the guaranteed rate of the second queue is zero; and
wherein a guaranteed rate of a particular queue is a minimum rate at which data is scheduled to be out of the particular queue when the particular queue is not empty.

15. The non-transitory computer-readable medium according to claim 14, wherein the programming instructions, when executed, instruct the at least one processor to:
generate the test data at a rate equal to the limit rate or higher than the limit rate.

16. The non-transitory computer-readable medium according to claim 14, wherein the programming instructions, when executed, instruct the at least one processor to:
generate the test data at a rate at which test data already stored in the second queue is scheduled to be out of the second queue.

17. The non-transitory computer-readable medium according to claim 14, wherein the first queue comprises a plurality of subqueues, and wherein the programming instructions, when executed, instruct the at least one processor to:
schedule data in a subqueue with a relatively higher priority to be in the third queue, and then schedule data in a subqueue with a relatively lower priority to be in the third queue.

18. The non-transitory computer-readable medium according to claim 13, wherein the programming instructions, when executed, instruct the at least one processor to:
schedule the service data in the first queue and the test data in the second queue to be in the third queue in a priority queuing manner according to the limit rate, wherein a priority of the second queue is lower than a priority of the first queue.

* * * * *